Dec. 7, 1943.  A. L. FREEDLANDER  2,336,084
METHOD OF MANUFACTURING WRAPPED BELTS
Filed Aug. 25, 1939
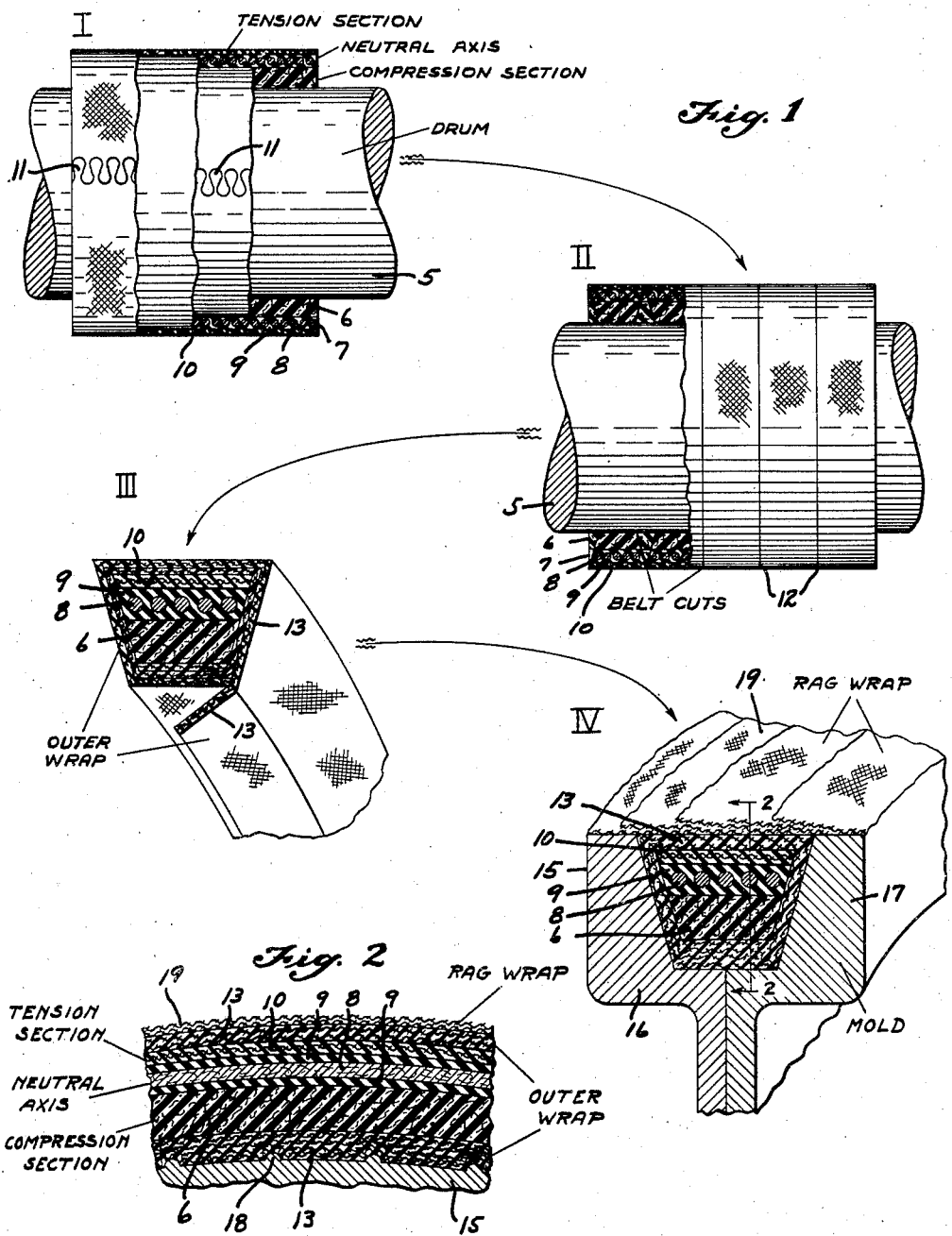

Patented Dec. 7, 1943

2,336,084

UNITED STATES PATENT OFFICE 2,336,084

METHOD OF MANUFACTURING WRAPPED BELTS

Abraham L. Freedlander, Dayton, Ohio, assignor to The Dayton Rubber Mfg. Company, Dayton, Ohio, a corporation of Ohio Application August 25, 1939, Serial No. 291,921

1 Claim. (Cl. 154—4)

This invention relates to belts and especially to an improved method of making grooved wrapped belts.

It is an object of this invention to provide a process whereby the manufacture of wrapped endless belts is greatly simplified with a substantial reduction in cost of manufacture.

Another object is to provide an improved process of manufacturing belts of this type comprising built-up laminated rubberized fabric layers which are picot spliced together to form a substantially inextensible preformed belt. The whole is thereafter vulcanized to produce a belt having grooves or corrugations on the inner working surface. Belts made according to this process offer improved resistance to stretching or lengthening during use and have a high degree of flexibility. The belts also are cooler running which results in lengthening the life of the belt and one requiring less adjustment in service.

Another object is to provide an improved method of making a V-type wrapped belt wherein spaced grooves are molded along the inner working surface of the belt. By my improved method grooves of any desired shape and size may be formed in the belt without breaking or weakening the fabricated layers forming the body of the belt. The indentations in the inner surface are adapted to close up at the bend portion when the belt passes around a pulley of relatively small radius. In this manner the compression force exerted on the inside of the belt is expended in closing the grooves so that internal stress is not developed and a more flexible and cooler running belt is provided.

Referring to the drawing:

Figure 1 is a view in elevation and partly in section, illustrating the four steps in manufacturing the wrapped endless V-belts of this invention;

Figure 2 is a fragmentary sectional detail view taken on the line 2—2 in the last step of Figure 1, showing the preformed belt positioned in the mold preparatory to vulcanizing or curing.

In general, in my improved method, I propose to utilize a drum or mandrel 5 of the desired diameter upon which the laminated layers forming the belt are applied to produce an endless or continuous belt. As shown in Figure 1, my method comprises the following steps:

Step I

There is applied over the surface of the drum 5 a compression section layer 6 comprising "Stiflex" or other suitable reinforced rubber composition. "Stiflex" comprises rubber reinforced with fine parallel transversely disposed textile fibers. This is preferably used but it will be appreciated that other rubber or synthetic rubber compositions may be employed.

Superimposed over the compression layer is a neutral axis or inextensible section 7 comprising cords 8 which are embedded in rubber 9. Laid over the neutral axis layer is a tension section 10 formed of a plurality of rubberized layers of fabric. The fabric is preferably bias-laid square woven; however, straight-laid square woven fabric may be used if desired.

The tension and compression sections have their respective abutting ends interlocked in the form of picot splices as shown at 11. In the neutral axis section 7 the cords 8 are of continuous length and may be applied by spirally winding them therearound over a layer of rubber 9 and thereafter covering them with added rubber material to provide a rubberized section having inextensible cords embedded therein. In this connection the cords may be either independently wound or applied as a cord fabric.

Step II

After the belt body has been built up of laminated layers on the drum 5, it is severed into individual belts as indicated at 12. Endless belts of any desired width and angle of side walls may be made by varying the cutting. In this way a plurality of belts of predetermined width and shape is provided.

Step III

When the belt cores have been severed they are removed from the drum and wrapped with rubberized fabric 13 as shown. This cover or wrapper comprises a convolute layer construction wherein the fabric is bias-laid with respect to the longitudinal axis of the belt. This increases the lateral rigidity of the belt. The number of layers of fabric forming the wrapper may be varied; preferably the top and bottom sides of the belt will comprise four plies of fabric, as illustrated in Figure 2.

Step IV

After the wrapper has been applied to the belt it is ready for molding and curing to form the finished product. To accomplish this, the ring mold, generally designated 15, is provided with halves 16 and 17 having the proper inclined side wall portions corresponding to the predetermined shape of the belt. Along the bottom side of the mold spaced ribs 18 are provided of desired size and shape which extend transversely of the mold and are adapted to mold grooves along the inner side of the belt. Preferably one of the mold halves includes the groove forming mold portions integral therewith to facilitate the molding of the grooves and make it easier to remove the belt from the mold after vulcanization.

In using the mold 15 the preformed belt is placed in the open mold halves suitably interlocked and rag wrap material 19 tightly bound around the ring mold and top of the belt as illustrated in Figure 1. The rag wrap forces the belt to conform to the mold surfaces so that a uniform molded product is produced. After the rag wrap has been applied, vulcanization is brought about to produce a hard, resilient, flexible, endless belt having spaced transverse grooves formed along the inner working surface.

It will be understood that in practicing my process of forming grooved endless belts the term "rubber" includes synthetic rubber or equivalent synthetic moldable resinous materials. Further it is likewise to be understood that the number of plies of straight-laid and bias-laid square woven rubberized fabric used in the respective portions of the belt may be modified to meet widely varied conditions to which the belt is to be subjected. Further, in place of "Stiflex" I may use rubber or synthetic resinous compositions with or without the use of embedded reinforcing fiber material.

It will be further understood that my invention is not to be limited to the exact procedure but may be modified to suit varying conditions in use within the scope of the claim and this invention.

Having thus fully described my invention, what I claim as new and desire to secure by Letters Patent is:

The process of making molded a grooved wrapped belt of the endless type having substantially flat top and side surfaces and grooves molded transverse of its longitudinal axis along the bottom side thereof, comprising the steps of (a) applying a layer of fiber reinforced with rubber over a drum or mandrel having a smooth plane surface to form the compression section of the belt, (b) superimposing thereon a rubber layer comprising parallel laid substantially non-extensible cords forming the neutral axis section, (c) applying thereover a rubberized fabric layer comprising bias-laid square woven fabric to form a tension section, picot splicing the layers of said tension and compression sections so as to form a joint of the same thickness as the respective layer, (d) cutting the laminated material forming the belt circumferentially of the drum to form one or more belts of the desired shape, (e) removing the cut belts from the drum and applying a wrapper therearound, said wrapper comprising bias-laid square woven fabric embedded in rubber, and (f) introducing the preformed wrapped belt in a mold having inclined side walls and spaced transverse ribs for engaging the inner surface of the belt, and maintaining the belt compressed in the mold by applying a wrapping tightly over the belt and mold while curing the product to produce a unitary belt structure having grooves along the inner working surfaces of the belt.

ABRAHAM L. FREEDLANDER.